United States Patent
Liao et al.

(10) Patent No.: US 12,493,804 B2
(45) Date of Patent: Dec. 9, 2025

(54) METHOD OF BUILDING AND OPERATING DECODING STATUS AND PREDICTION SYSTEM

(71) Applicant: SOLID STATE STORAGE TECHNOLOGY CORPORATION, Taipei (TW)

(72) Inventors: Yen-Chin Liao, Taipei (TW); Ching-Hui Huang, Taipei (TW); Shih-Jia Zeng, Taipei (TW); Hsie-Chia Chang, Taipei (TW)

(73) Assignee: SOLID STATE STORAGE TECHNOLOGY CORPORATION, Taipei (TW)

( * ) Notice: Subject to any disclaimer, the term of this patent is extended or adjusted under 35 U.S.C. 154(b) by 1042 days.

(21) Appl. No.: 17/366,315

(22) Filed: Jul. 2, 2021

(65) Prior Publication Data
US 2021/0334684 A1    Oct. 28, 2021

Related U.S. Application Data

(62) Division of application No. 15/885,907, filed on Feb. 1, 2018, now abandoned.

(30) Foreign Application Priority Data

Nov. 24, 2017    (CN) .......................... 201711191037.7

(51) Int. Cl.
*G06N 5/04*    (2023.01)
*G06N 7/01*    (2023.01)
(Continued)

(52) U.S. Cl.
CPC ................ *G06N 5/04* (2013.01); *G06N 7/01* (2023.01); *G06N 20/00* (2019.01); *G11C 16/28* (2013.01)

(58) Field of Classification Search
USPC ........................................................... 706/12
See application file for complete search history.

(56) References Cited

U.S. PATENT DOCUMENTS

| | | | |
|---|---|---|---|
| 6,216,134 B1 * | 4/2001 | Heckerman | G06F 16/358 |
| | | | 707/999.005 |
| 8,370,280 B1 * | 2/2013 | Lin | G06N 5/04 |
| | | | 706/12 |

(Continued)

FOREIGN PATENT DOCUMENTS

CN           103744962           4/2014

OTHER PUBLICATIONS

Lazarevic, Aleksandar, et al. "Localized prediction of continuous target variables using hierarchical clustering." Third IEEE International Conference on Data Mining. IEEE, 2003. (Year: 2003).

(Continued)

*Primary Examiner* — Vincent Gonzales
*Assistant Examiner* — Em N Trieu
(74) *Attorney, Agent, or Firm* — WPAT, PC

(57) ABSTRACT

A method of building a decoding status prediction system is provided. Firstly, plural read records are collected during read cycles of a flash memory. Then, the plural read records are classified into read records with a first read result and read records with a second read result. Then, a first portion of the read records with the first read result are divided into K0 groups according to a clustering algorithm, and a second portion of the read records with the second read result are divided into K1 groups according to the clustering algorithm. Then, the read records of the K0 groups and the K1 groups are used to train prediction models. Consequently, K0×K1 prediction models are generated. Then, the prediction models are combined as a prediction database.

7 Claims, 3 Drawing Sheets

(51) Int. Cl.
*G06N 20/00* (2019.01)
*G11C 16/28* (2006.01)

(56) References Cited

U.S. PATENT DOCUMENTS

| | | | | |
|---|---|---|---|---|
| 8,626,791 B1* | 1/2014 | Lin | ................... | G06N 20/00 |
| | | | | 707/777 |
| 2006/0155541 A1* | 7/2006 | Tate | ................... | B60W 40/12 |
| | | | | 704/256.3 |
| 2010/0100511 A1* | 4/2010 | Hirose | ................... | G06N 20/00 |
| | | | | 706/12 |
| 2010/0207762 A1* | 8/2010 | Lee | ................... | G06V 20/52 |
| | | | | 340/541 |
| 2013/0159226 A1* | 6/2013 | Cheng | ................... | G06N 3/088 |
| | | | | 706/12 |
| 2014/0153332 A1* | 6/2014 | Parthasarathy | ........ | G11C 29/52 |
| | | | | 365/185.09 |
| 2016/0048756 A1* | 2/2016 | Hall | ................... | G06N 3/08 |
| | | | | 706/20 |
| 2016/0306572 A1* | 10/2016 | Ryan | ................... | G11C 16/349 |
| 2017/0083920 A1* | 3/2017 | Zoldi | ................... | G06N 20/00 |
| 2017/0109431 A1* | 4/2017 | Yang | ................... | H04L 51/58 |
| 2017/0330349 A1* | 11/2017 | Kolesnikov | .......... | H04N 19/176 |
| 2017/0345489 A1* | 11/2017 | Zeng | ................... | G11C 29/028 |
| 2018/0040336 A1* | 2/2018 | Wu | ................... | G10L 19/26 |
| 2018/0158163 A1* | 6/2018 | Zhang | ................ | G06Q 50/2057 |
| 2019/0012573 A1 | 1/2019 | Oyamada et al. | | |

OTHER PUBLICATIONS

Kulkarni, Arun D., and Barrett Lowe. "Random forest algorithm for land cover classification." International Journal on Recent and Innovation Trends in Computing and Communication (2016). (Year: 2016).

Subramanyam, Harihar G. A system for storage and analysis of machine learning operations. Diss. Massachusetts Institute of Technology, 2017. (Year: 2017).

* cited by examiner

| K | K0=6,K1=6 | | K0=12,K1=6 | | K0=6,K1=12 | | K0=12,K1=12 | |
|---|---|---|---|---|---|---|---|---|
| | Label-0 | Label-1 | Label-0 | Label-1 | Label-0 | Label-1 | Label-0 | Label-1 |
| 1 | 0.840 | 0.865 | 0.885 | 0.787 | 0.765 | 0.903 | 0.820 | 0.850 |
| 2 | 0.878 | 0.811 | 0.892 | 0.763 | 0.811 | 0.849 | 0.843 | 0.858 |
| 3 | 0.892 | 0.813 | 0.892 | 0.767 | 0.805 | 0.872 | 0.853 | 0.852 |
| 4 | 0.923 | 0.751 | 0.922 | 0.709 | 0.733 | 0.921 | 0.856 | 0.849 |

METHOD OF BUILDING AND OPERATING DECODING STATUS AND PREDICTION SYSTEM

This is a divisional application of co-pending U.S. application Ser. No. 15/885,907, filed Feb. 1, 2018, which claims the benefit of People's Republic of China Patent Application No. 201711191037.7, filed Nov. 24, 2017, the subject matter of which is incorporated herein by reference.

FIELD OF THE INVENTION

The present invention relates to a data analyzing method, and more particularly to a building method and an operating method of a decoding status prediction system.

BACKGROUND OF THE INVENTION

As is well known, flash memories are widely used in various electronic devices. After the flash memory has been written and erased many times, the characteristics of the flash memory are gradually suffered from degradation. Under this circumstance, the read data are possibly erroneous during the decoding process.

If the read data of the flash memory are erroneous, a read retry operation has to be performed on the flash memory. While the read retry operation is performed, the read parameters (e.g., a read voltage) for the flash memory are changed. Due to the proper read parameters, the read data can be successfully decoded and the read data are accurately outputted.

However, even if the read parameters for the flash memory are changed many time during the read retry process, the read data are possibly unable to be successfully decoded. That is, since the read data are erroneous during the decoding process, the flash memory cannot output the corrected read data. Under this circumstance, a read failure problem occurs.

SUMMARY OF THE INVENTION

An embodiment of the present invention provides a method of building a decoding status prediction system. Firstly, plural read records are collected during read cycles of a flash memory. Then, the plural read records are classified into read records with a first read result and read records with a second read result. Then, a first portion of the read records with the first read result are divided into K0 groups according to a clustering algorithm, and a second portion of the read records with the second read result are divided into K1 groups according to the clustering algorithm. Then, the prediction models are trained with one to one combination of the read records of the K0 groups and the K1 groups. Consequently, K0×K1 prediction models are generated. Then, these prediction models are collected as a prediction database.

Another embodiment of the present invention provides an operating method of a prediction system for use in a flash memory. The prediction system includes a prediction database. The prediction database includes K0×K1 prediction models that are obtained by training with one to one combination of data in K0 groups and K1 groups. Firstly, K0 central points of the K0 groups are calculated, and K1 central points of the K1 groups are calculated. Then, a reference point is received. Then, K0 distances between the reference point and the central points of the K0 groups are calculated, and K1 distances between the reference point and the K1 central points of the K1 groups are calculated. Then, K prediction models are selected from the prediction database according to the (K0+K1) distances. Then, the reference point is inputted into the K prediction models. Consequently, a prediction result is obtained.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
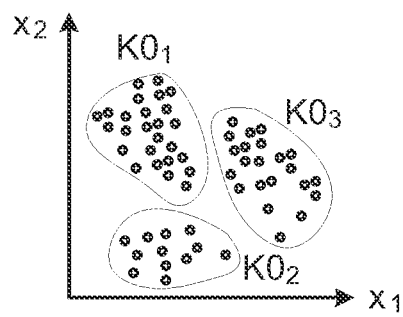
FIGS. 1A, 1B and 1C schematically illustrate the K0 group and the K1 group that are obtained according to the clustering algorithm.

The present invention provides a method of building a decoding status prediction system. During read cycles of the flash memory, plural parameters for each read data and the read result are collected as read records. Then, the collected read records are divided into plural groups. Then, a machine learning technology is used to train and build a prediction model. Finally, all of the prediction models are collected as a prediction database, the prediction system of the present invention is built. The method of building the status prediction system will be described as follows.

When a host issues a command to read the data of the flash memory, plural parameters for reading each data and the read result are collected as a read record. For example, the plural parameters include a status parameter of the flash memory, an environment parameter, and so on.

For example, each read record contains three parameters. That is, each read data corresponds to a three-dimensional $(x_1, x_2, x_3)$ read record. The first read record is $y_1(x_{11}, x_{21}, x_{31})$. The second read record is $y_2(x_{12}, x_{22}, x_{32})$. The m-th read record is $y_m(x_{1m}, x_{2m}, x_{3m})$. The rest may be deduced by analogy.

In the above read records, the values $y_1 \sim y_m$ indicate the read results of the read data. For example, in case that $y_1=0$, the first data is successfully decoded. In case that $y_2=1$, the second data is not successfully decoded. In other words, among the m read records $y_1 \sim y_m$, those who have the read results "0" indicate that the corresponding data are successfully decoded, and the others, which read results are "1", indicate that the corresponding data are not successfully decoded. If the data is successfully decoded, the read data can be acquired. Whereas, if the data is not successfully decoded, the read data cannot be acquired.

In the read record, $x_1$, $x_2$ and $x_3$ represent some parameters for reading the data. For example, $x_1$ is a block erase count, $x_2$ is a read voltage, and $x_3$ is an environment temperature. If the first read record $y_1(x_{11}, x_{21}, x_{31})=y_1(50, 12.5, 35)=0$, which means the first read data is successfully decoded under the condition that the block erase count is 50, the read voltage is 12.5V and the environment temperature is 35° C. If the second read record $y_2(x_{12}, x_{22}, x_{32})=y_2(105, 11.5, 45)=1$, which means the second read data is not successfully decoded under the condition that the block erase count is 105, the read voltage is 11.5V and the environment temperature is 45° C. The rest may be deduced by analogy.

As mentioned above, the plural parameters for each read data and the read result are collected as the read record when the host issues the command to read the data from the flash memory. In each read record, the number of parameters is the dimension of the read record. It is noted that the dimension of the read record is not restricted. That is, if the read record has more parameters, the read record has a higher dimension. For example, we can have additional 3 parameters $x_4$, $x_5$, and $x_6$ in the read record. The parameter $x_4$ indicates the data program time, the parameter $x_5$ indicates the address information, and the parameter $x_6$ indicates the data retention time.

For clarification, a two-dimensional read record will be used to describe the method of building the decoding status prediction system. Of course, a read record with a higher dimension is suitably applied to the building method of the present invention.

Firstly, a software program collects plural read records when issuing the read recommends to the flash memory. For example, the software program collects m read records about the read cycle or the read command. Then, the m read records are classified into two categories according to the read results. For example, the m read records are classified into the read records with the read result "0" and the read records with the read result "1".

Generally, the number of the read records with the read result "0" is much more than the number of the read records with the read result "1". Then, a portion of the read records with the read result "0" are obtained according to a random under-sampling method. Consequently, the number of the read records with the read result "0" is equal to the number of the read records with the read result "1".

Then, the entire or a portion of the read records with the read result "0" are divided into K0 groups according to a clustering algorithm, and the entire or a portion of the read records with the read result "1" are divided into K1 groups according to the clustering algorithm. For example, according to a k-means clustering algorithm, the read records with the read result "0" are divided into the K0 groups and the read records with the read result "1" are divided into the K1 groups.

Figure 1B:
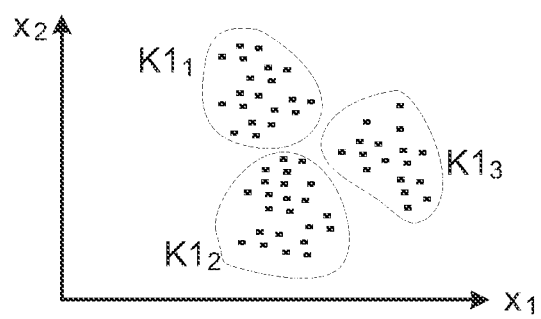
Figure 1C:
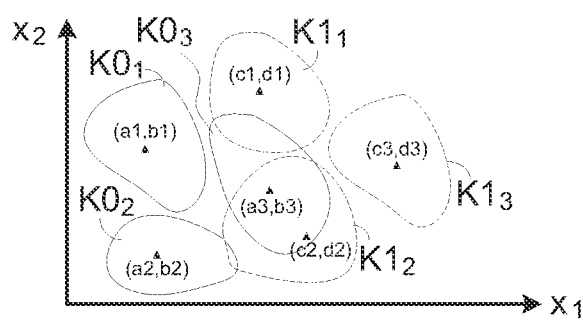

FIGS. 1A, 1B and 1C schematically illustrate the K0 group and the K1 group that are obtained according to the clustering algorithm.

In the two dimensional ($X_1$-$X_2$) plane of FIG. 1A, each circular dot represents one read record with the read result "0". For example, K0=3. According to the clustering algorithm, plural read records with the read result "0" are divided into three groups $K0_1$, $K0_2$ and $K0_3$. Moreover, the central points of the three groups $K0_1$, $K0_2$ and KOs are calculated according to the read records of the corresponding groups.

In the two dimensional ($X_1$-$X_2$) plane of FIG. 1B, each square mark represents one read record with the read result "1". For example, K1=3. According to the clustering algorithm, plural read records with the read result "1" are divided into three groups $K1_1$, $K1_2$ and $K1_3$. Moreover, the central points of the three groups $K1_1$, $K1_2$ and $K1_3$ are calculated according to the read records of the corresponding groups.

Generally, after K0 and K1 are determined, the clustering algorithm is subsequently performed. After the clustering algorithm is completed, the K0 groups and the K1 groups are obtained. It is noted that the numbers of K0 and K1 are not restricted. That is, the numbers of K0 and K1 may be determined according to the practical requirements.

Please refer to FIG. 10. The central point of the group $K0_1$ is at (a1, b1). The central point of the group $K0_2$ is at (a2, b2). The central point of the group $K0_3$ is at (a3, b3). The central point of the group $K1_1$ is at (c1, d1). The central point of the group $K1_2$ is at (c2, d2). The central point of the group $K1_3$ is at (c3, d3).

After the (K0+K1) groups are determined according to the clustering algorithm, the machine learning technology is used to train the prediction models with the combination data from one of the three groups $K0_1$, $K0_2$ and $K0_3$ and one of the groups $K1_1$, $K1_2$ and $K1_3$. Consequently, a prediction model is built. In other words, K0×K1 prediction models are generated according to the K0 groups and the K1 groups. For example, if K0 is 3 and K1 is 3, a total of 9 prediction models are generated.

Generally, after one prediction model is generated, the prediction model can be used to predict the read action of the flash memory. For example, after arbitrary parameters x1 and x2 are inputted into the prediction model, the probability (P0) of the read result "0" and the probability (P1) of the read result "1" are outputted from the prediction model. If the probability (P0) of the read result "0" is higher than the probability (P1) of the read result "1", the prediction model predicts that the data would be successfully decoded when the flash memory is operated under the parameters x1 and x2. If the probability (P0) of the read result "0" is lower than the probability (P1) of the read result "1", the prediction model predicts that the data would not be decoded successfully when the flash memory is operated under the parameters x1 and x2.

For example, after the entire or a portion of the read records in the group $K0_1$ and the entire or a portion of the read records in the group $K1_1$ are used to train a prediction model according to the machine learning technology, the prediction model $M_{11}$ is generated. Similarly, after the entire or a portion of the read records in the group $K0_1$ and the entire or a portion of the read records in the group $K1_2$ are used to train a prediction model according to the machine learning technology, the prediction model $M_{12}$ is generated. The rest may be deduced by analogy. In other words, K0×K1 prediction models are generated according to the K0 groups and the K1 groups. The K0×K1 prediction models are collected as a prediction database. Preferably, the prediction model is a binary classifier such as a random forest classifier.

Figure 2:
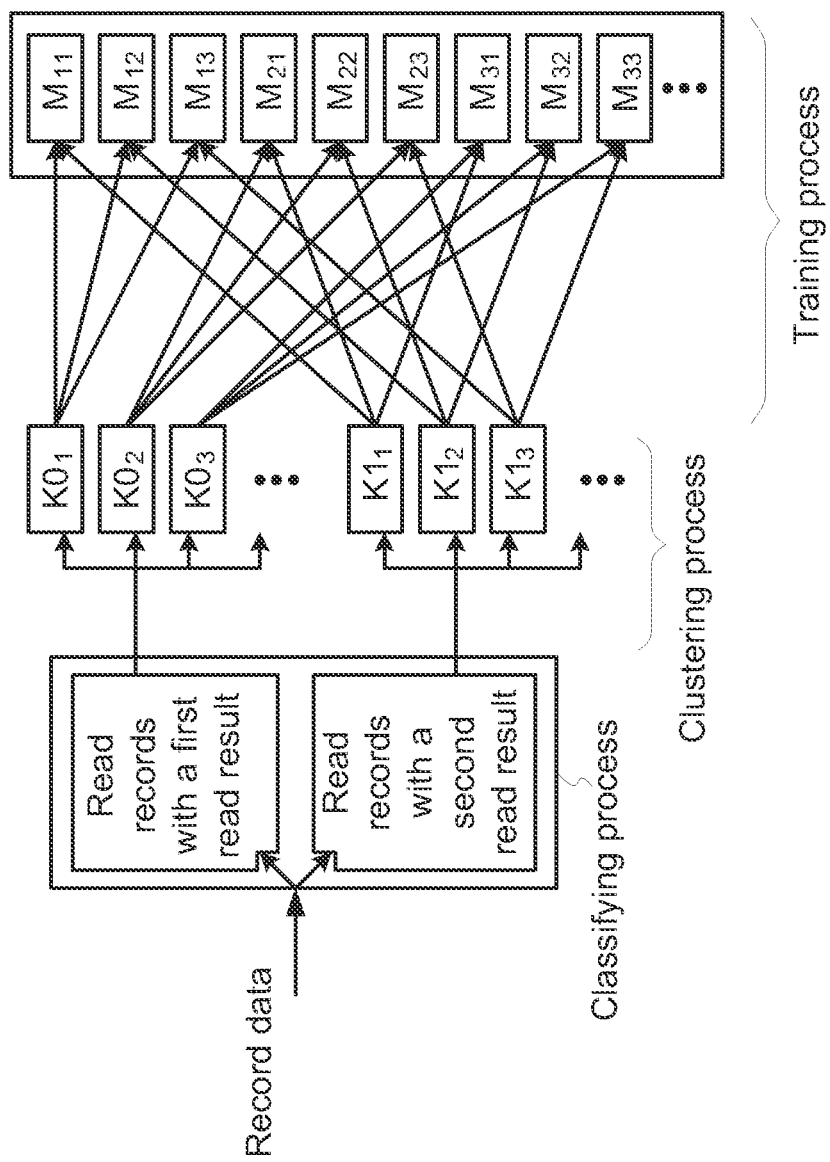
FIG. 2 is a flowchart illustrating a method of building a decoding status prediction system according to an embodiment of the present invention.

FIG. 2 is a flowchart illustrating a method of building a decoding status prediction system according to an embodiment of the present invention.

Firstly, during a software program issues read cycles to the flash memory, plural parameters for each read data and the read result are collected as a read record. Consequently, the software program collects plural read records about the flash memory.

Then, a classifying process is performed. Consequently, the collected read records are classified into the read records with a first read result (i.e., the successfully-decoded read records) and the read records with a second read result (i.e., the unsuccessfully-decoded read records).

Then, a clustering process is performed. Consequently, the entire or a portion of the read records with the first read result are divided into K0 groups, and the entire or a portion of the read records with the second read result are divided into K1 groups.

Then, a training process is performed. After the read records in each of the K0 groups and the read records in each of the K1 groups are combined to train prediction models, the K0×K1 prediction models are generated. Moreover, the K0×K1 prediction models are collected as a prediction database. Consequently, the prediction system of the present invention is built.

After the prediction system is built, a predicting process can be performed. Since the prediction database contains plural prediction models, the prediction system can select K predetermined models from the prediction database according to the inputted reference point. Moreover, the prediction system predicts whether the reference point would be successfully decoded according to the selected K predetermined models. The operating principles will be described in more details as follows.

Figures 3A, 3B, 4:
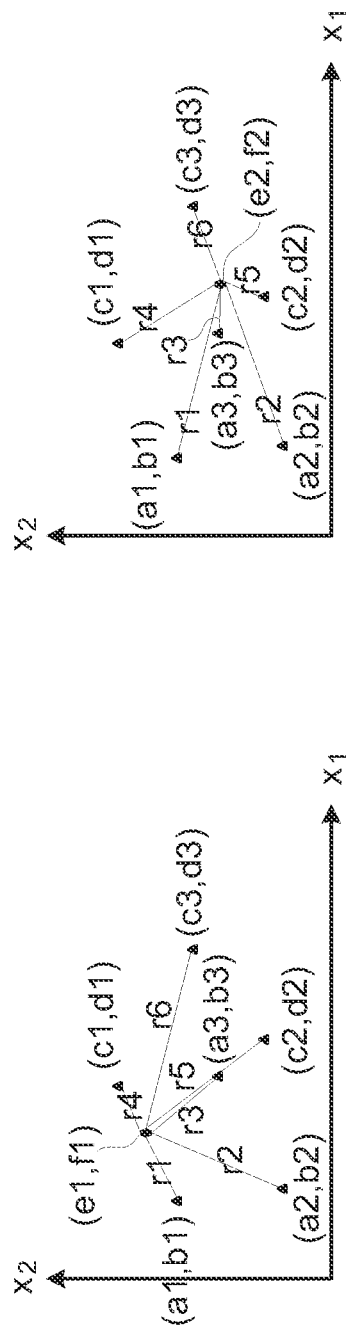
FIGS. 3A and 3B illustrate a selecting process of the prediction model.
FIG. 4 schematically illustrates plural test results of the prediction system.

FIGS. 3A and 3B illustrate a selecting process of the prediction system. As shown in FIG. 3A, a reference point (e1, f1) is inputted into the prediction system. Then, the distances between the reference point (e1, f1) and the center points of the (K0+K1) groups are calculated. The distance between the reference point (e1, f1) and the center point (a1, b1) of the group $K0_1$ is r1. The distance between the reference point (e1, f1) and the center point (a2, b2) of the group $K0_2$ is r2. The distance between the reference point (e1, f1) and the center point (a3, b3) of the group $K0_3$ is r3. The distance between the reference point (e1, f1) and the center point (c1, d1) of the group $K1_1$ is r4. The distance between the reference point (e1, f1) and the center point (c2, d2) of the group $K1_2$ is r5. The distance between the reference point (e1, f1) and the center point (c3, d3) of the group $K1_3$ is r6.

In the example of FIG. 3A, r4<r1<r3<r2<r5<r6. In case that the number K of the predetermined models is 1, the group $K1_1$ corresponding to the distance r4 and the group $K0_1$ corresponding to the distance r1 are selected. The prediction model $M_{11}$, which is trained by using the read records in the group $K1_1$ and the read records in the group $K0_1$, is selected. Then, the reference point (e1, f1) is predicted according to the prediction model $M_{11}$.

In case that the number K of the predetermined models is 2, there are two prediction models to be selected from the prediction database. The first one is the prediction model $M_{11}$, which is described in previous paragraph, the other one is predication model $M_{31}$, which is trained by using the read records in the group $K1_1$ and the read records in the group $K0_3$. Then, the reference point (e1, f1) is predicted according to the prediction model $M_{11}$ and the prediction model $M_{31}$.

From the above description, the prediction system calculates the distances between the reference point and the center points of all groups. The prediction models corresponding to the shortest distances have the higher priority to be selected from the prediction database as the K prediction models. The reference point is predicted according to the selected prediction models. In case that the number K of the predetermined models is larger than 2, the similar method is employed to select the prediction models.

Moreover, the sign (+/−) of the sum of the K log probability ratios is used to indicate the prediction result. That is, the log-likelihood ratio (LLR) may be expressed as:

$$LLR = \sum_K \log \frac{P0_K}{P1_K}$$

For example, the number K of the predetermined models is 1, and the prediction model $M_{11}$ is used to predict the reference point (e1, f1). After the reference point (e1, f1) is inputted into the prediction model $M_{11}$, the probability (P0) of the read result "0" is 0.8 and the probability (P1) of the read result "1" is 0.2. Consequently, the log-likelihood ratio (LLR) may be calculated as:

$$LLR = \sum_K \log \frac{P0_K}{P1_K} = \log \frac{0.8}{0.2} = +0.602$$

Since the value of LLR is positive, the prediction system predicts that the data would be successfully decoded when the flash memory is operated under the condition of the reference point (e1, f1). In other words, the read data is accurately acquired.

For example, the number K of the predetermined models is 2, and the prediction model $M_{11}$ and $M_{31}$ are used to predict the reference point (e1, f1). After the reference point (e1, f1) is inputted into the prediction model $M_{11}$, the probability (P0) of the read result "0" is 0.8 and the probability (P1) of the read result "1" is 0.2. After the reference point (e1, f1) is inputted into the prediction model $M_{31}$, the probability (P0) of the read result "0" is 0.72 and the probability (P1) of the read result "1" is 0.28. Consequently, the log-likelihood ratio (LLR) may be calculated as:

$$LLR = \sum_K \log \frac{P0_K}{P1_K} = \log \frac{0.8}{0.2} + \log \frac{0..72}{0.28} = +1.12$$

Since the value of LLR is positive, the prediction system predicts that the data would be successfully decoded when the flash memory is operated under the condition of the reference point (e1, f1). In other words, the read data is accurately acquired.

As shown in FIG. 3B, a reference point (e2, f2) is inputted into the prediction model. Then, the prediction model calculates the distances between the reference point (e2, f2) and the center points of the (K0+K1) groups. The distance between the reference point (e2, f2) and the center point (a1, b1) of the group $K0_1$ is r1. The distance between the reference point (e2, f2) and the center point (a2, b2) of the group $K0_2$ is r2. The distance between the reference point (e2, f2) and the center point (a3, b3) of the group $K0_3$ is r3. The distance between the reference point (e2, f2) and the center point (c1, d1) of the group $K1_1$ is r4. The distance between the reference point (e2, f2) and the center point (c2, d2) of the group $K1_2$ is r5. The distance between the reference point (e2, f2) and the center point (c3, d3) of the group $K1_3$ is r6.

In the example of FIG. 3B, r5<r3<r6<r4<r2<r1. In case that the number K of the predetermined models is 1, the group $K1_2$ corresponding to the distance r5 and the group $K0_3$ corresponding to the distance r3 are selected. The prediction model $M_{32}$, which is trained by using the read records in the group $K1_2$ and the read records in the group $K0_3$ is selected. Then, the reference point (e2, f2) is predicted according to the prediction model $M_{32}$.

In case that the number K of the predetermined models is 2, there are two prediction models to be selected from the prediction database. The first one is the prediction model $M_{32}$, which is described in the previous paragraph, the other one is prediction model $M_{33}$, which is trained by using the read records in the group K1₃ and the read records in the group K0₃. Then, the reference point (e2, f2) is predicted according to the prediction model $M_{32}$ and the prediction model $M_{33}$.

For example, the number K of the predetermined models is 1, and the prediction model $M_{32}$ is used to predict the reference point (e2, f2). After the reference point (e2, f2) is inputted into the prediction model $M_{32}$, the probability (P0) of the read result "0" is 0.42 and the probability (P1) of the read result "1" is 0.58. Consequently, the log-likelihood ratio (LLR) may be calculated as:

$$LLR = \sum_K \log \frac{P0_K}{P1_K} = \log \frac{0.42}{0.58} = -0.140$$

Since the value of LLR is negative, the prediction system predicts that the data would not be successfully decoded when the flash memory is operated under the condition of the reference point (e2, f2). In other words, the read data cannot be accurately acquired.

For example, the number K of the predetermined models is 2, and the prediction model $M_{32}$ and $M_{33}$ are used to predict the reference point (e2, f2). After the reference point (e2, f2) is inputted into the prediction model $M_{32}$, the probability (P0) of the read result "0" is 0.42 and the probability (P1) of the read result "1" is 0.58. After the reference point (e2, f2) is inputted into the prediction model $M_{33}$, the probability (P0) of the read result "0" is 0.38 and the probability (P1) of the read result "1" is 0.62. Consequently, the log-likelihood ratio (LLR) may be calculated as:

$$LLR = \sum_K \log \frac{P0_K}{P1_K} = \log \frac{0.42}{0.58} + \log \frac{0.38}{0.62} = -0.353$$

Since the value of LLR is negative, the prediction system predicts that the data would not be successfully decoded when the flash memory is operated under the condition of the reference point (e2, f2). In other words, the read data cannot be accurately acquired.

From the above descriptions, the preset invention provides a decoding status prediction system. The decoding status prediction system is used for predicting whether data in the flash memory can be successfully decoded. If the data would not be successfully decoded when the flash memory is operated under the condition of the reference point, the flash memory enters a read retry operation is performed on the flash memory. Consequently, the performance of the flash memory is enhanced.

Moreover, after m read records are collected and the above method is implemented, the prediction system of the present invention is built. The m read records may be collected when the flash memory is online operated by the user. Similarly, other n read records are collected as test read records. That is, the prediction system may be tested according to the test read records. The n read records with the known results are used to test the prediction results of the prediction models in the prediction database. Generally, the ratio of the value m to the value n is about 7:3. It is noted that the ratio of value m to the value n is not restricted. A method of testing the prediction system will be illustrated as follows.

FIG. 4 schematically illustrates plural test results of the prediction system. For example, the flash memory collects 100182 read records. Each read record contains 31 parameters and 1 read result. That is, each read record has 31 dimensions.

Firstly, 70% of the collected 100182 read records are randomly selected for building the prediction system. Moreover, the other 30% of the collected 100182 read records are used for testing the prediction system. That is, about 70127 read records (i.e., m=70127) are used for building the prediction system, and about 30055 read records (i.e., n=30055) are used for testing the prediction system.

In an embodiment, four prediction systems are built by using the prediction system building system of the present invention. In the first prediction system, the entire or a portion of the read records with the first read result are divided into 6 groups (i.e., K0.6) and the entire or a portion of the read records with the second read result are divided into 6 groups (i.e., K1=6). Consequently, the prediction database of the first prediction system contains 36 prediction models. In the second prediction system, the entire or a portion of the read records with the first read result are divided into 12 groups (i.e., K0=12) and the entire or a portion of the read records with the second read result are divided into 6 groups (i.e., K1=6). Consequently, the prediction database of the second prediction system contains 72 prediction models. In the third prediction system, the entire or a portion of the read records with the first read result are divided into 6 groups (i.e., K0.6) and the entire or a portion of the read records with the second read result are divided into 12 groups (i.e., K1=12). Consequently, the prediction database of the third prediction system contains 72 prediction models. In the fourth prediction system, the entire or a portion of the read records with the first read result are divided into 12 groups (i.e., K0=12) and the entire or a portion of the read records with the second read result are divided into 12 groups (i.e., K1=12). Consequently, the prediction database of the third prediction system contains 144 prediction models.

Take the first prediction system for example. In case that 1 predetermined model (K=1) is selected from the prediction database to predict all of the n (=30055) test read records, the first prediction system predicts that the accuracy of successfully decoding the data is about 0.840 (i.e., Label-0) and predicts that the accuracy of unsuccessfully decoding the data is about 0.865 (i.e., Label-1).

In case that 2 predetermined models (K=2) is selected from the prediction database to predict all of the n (=30055) test read records, the first prediction system predicts that the accuracy of successfully decoding the data is about 0.878 (i.e., Label-0) and predicts that the accuracy of unsuccessfully decoding the data is about 0.811 (i.e., Label-1).

In case that 3 predetermined models (K=3) is selected from the prediction database to predict all of the n (=30055) test read records, the first prediction system predicts that the accuracy of successfully decoding the data is about 0.892 (i.e., Label-0) and predicts that the accuracy of unsuccessfully decoding the data is about 0.813 (i.e., Label-1).

In case that 4 predetermined models (K=4) is selected from the prediction database to predict all of the n (=30055) test read records, the first prediction system predicts that the accuracy of successfully decoding the data is about 0.923 (i.e., Label-0) and predicts that the accuracy of unsuccessfully decoding the data is about 0.751 (i.e., Label-1).

Obviously, the first prediction system has higher predicting accuracy. Consequently, the first prediction system can be effectively applied to the flash memory to enhance the performance of the flash memory. Similarly, the second prediction system, the third prediction system and the fourth prediction system also have the higher predicting accuracy. Consequently, the second prediction system, the third prediction system and the fourth prediction system can be effectively applied to the flash memory to enhance the performance of the flash memory.

Moreover, while the flash memory is operated online, the newly-collected read records may be fed back to the flash memory for training the prediction system. For example, whenever p read records are newly collected, the p read records are fed back to train the prediction system and then the prediction system is updated. For example, in case that the prediction system has (K0+K1) groups, the 1000 newly-collected read records (i.e., p=1000) are allocated into the (K0+K1) groups. After the newly-collected read records are allocated into the (K0+K1) groups, the center points of the allocated into the (K0+K1) groups are changed. After the training process, the prediction models are updated. Consequently, the predicting accuracy of the updated prediction system is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An operating method of a prediction system configured to operate in conjunction with a flash memory, wherein the prediction system comprises a prediction database containing K0×K1 prediction models, each prediction model being obtained by training with a one-to-one combination of data in K0 groups and K1 groups through machine learning; wherein plural read records are collected during read cycles of the flash memory, wherein read records with a first read result representing the corresponding data is successfully decoded are grouped into the K0 groups and read records with a second read result representing the corresponding data is not successfully decoded are grouped into the K1 groups, the operating method comprising:

calculating a central point of each of the K0 groups, and a central point of each of the K1 groups;

receiving a reference point inputted into the prediction system, wherein the reference point comprises read parameters including read voltage for the flash memory to be evaluated;

calculating distances between the reference point and the central point of each of the K0 groups, and calculating distances between the reference point and the central point of each of the K1 groups;

selecting K prediction models from the prediction database according to the distances between the reference point and the central point of each of the K0 groups and K1 groups; and inputting the reference point into the selected K prediction models to obtain a prediction result, wherein the prediction result represents whether the reference point would be successfully decoded when the flash memory is operated under the condition of the reference point, wherein if the data would not be successfully decoded when the flash memory is operated under the operating condition represented by the reference point, a read retry operation is performed on the flash memory, wherein the read retry operation adjusts the read parameters of the reference point for the flash memory.

2. The operating method as claimed in claim 1, wherein according to the distances between the reference point and the central point of each of the K0 groups and K1 groups, the prediction models corresponding to the shortest distances have the higher priority to be selected from the prediction database as the selected K prediction models.

3. The operating method as claimed in claim 1, wherein after the reference point is inputted into a first prediction model of the selected K prediction models, a probability of the first read result and a probability of the second read result are obtained.

4. The operating method as claimed in claim 3, wherein after the probability of the first read result is divided by the probability of the second read result, a probability ratio of the first prediction model is obtained.

5. The operating method as claimed in claim 4, wherein a sign of the sum of log probability ratios obtained by the selected K prediction models represents the prediction result.

6. The operating method as claimed in claim 1, further comprising:

collecting additional read records during read cycles of the flash memory; and allocating the additional read records into the corresponding K0 groups and K1 groups, so that the central points of the K0 and K1 groups are updated accordingly.

7. The operating method as claimed in claim 6, further comprising:

using the read records of the K0 groups and the K1 groups to train predication models, so that updated K0×K1 prediction models are generated and stored in the prediction database.

* * * * *